Jan. 14, 1969     R. S. BABINGTON ET AL     3,421,699

APPARATUS FOR SPRAYING LIQUIDS IN MONO-DISPERSED FORM

Filed Dec. 29, 1966                             Sheet 1 of 2

INVENTORS
ROBERT S. BABINGTON
WILLIAM R. SLIVKA
ALBERT A. YETMAN

BY Smith, Michael,
Bradford and Gardiner
ATTORNEYS

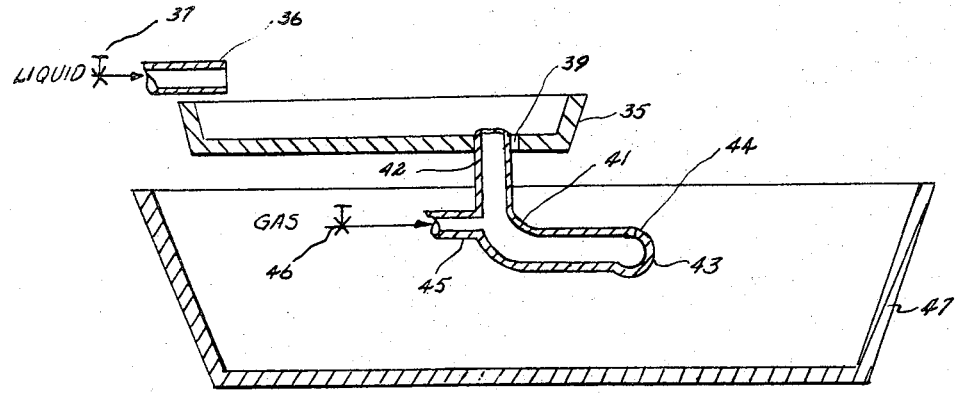
Fig-5
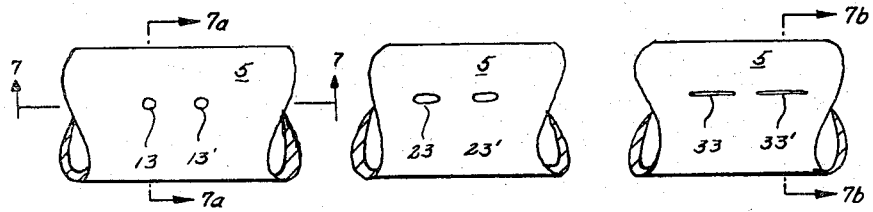
Fig 6a   Fig 6b   Fig 6c
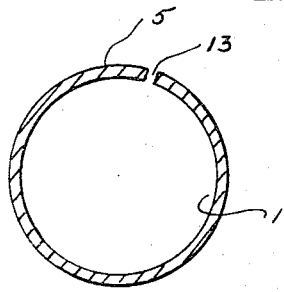 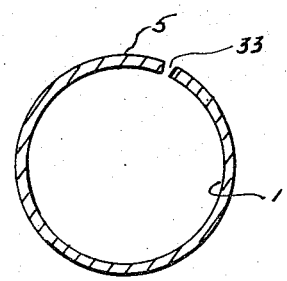
Fig 7a   Fig 7b United States Patent Office 3,421,699
Patented Jan. 14, 1969

3,421,699
APPARATUS FOR SPRAYING LIQUIDS IN MONO-DISPERSED FORM
Robert S. Babington, 1113 Ingleside Ave., McLean, Va. 22101, Albert A. Yetman, 12316 Kembridge Drive, Bowie, Md. 20715, and William R. Slivka, 17 Shellflower Road, Levittown, Pa. 19056
Filed Dec. 29, 1966, Ser. No. 605,779
U.S. Cl. 239—337     16 Claims
Int. Cl. B05b 7/32

ABSTRACT OF THE DISCLOSURE

The invention relates to a form of spraying device capable of producing extremely fine, 50 microns or less, spray particles in a uniform pattern by flow of a liquid over a smooth surface having an aperture therein, the surface being of such characteristics, either shape or because of the material from which formed, that the liquid is stressed into thin film form before it reaches the aperture. A gas introduced across the thin film, which also has an unconfined film surface, will cause minuscule particles of the liquid to break away from the free film surface, as the film is further stressed, to thus produce the very fine uniform spray.

---

Figure 1:
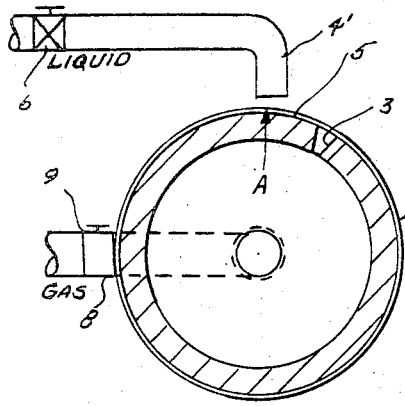

This invention is concerned with the dispersion of a liquid in a gaseous medium and with an apparatus for affecting such dispersion in a spray having unique characteristics, same being defined as a spray having characteristics closely approaching that of a natural fog. In particular, this invention is directed to apparatus capable of carrying out the method of dispersing liquids in a gaseous medium disclosed and claimed in the copending application of Robert S. Babington, William R. Slivka, and Albert A. Yetman Ser. No. 605,777, filed concurrently herewith.

The present invention has application and utility in a variety of environments such as, for example, atmosphere humidification, food processing and drying, chemical processing and the like. In fact, it may be stated broadly the invention has utility in any area wherein it is desired to disperse a liquid in the form of an extremely fine spray into a gaseous medium.

It has long been desired in many arts relating to liquid spraying, to produce a mono-dispersed spray of minuscule spherical droplets. A spray with such characteristics is extremely desirable because it exposes maximum surface area of the dispersed liquid to the gaseous medium which is extremely essential in such areas as atmospheric humidification, chemical treatment by absorption and the like. In addition where such a spray is used for coating, a prime example being metal lubrication, the deposited coating should be absolutely uniform and free from enlarged particles to form a smooth evenly laid coated surface.

The present invention has application in all of these areas and others, such as fuel atomization and the like, where particle size, particle shape and overall efficiency in terms of liquid dispersed per unit of energy input is desirable.

The invention also has utility in food processing, where it has been found that violent agitation of many foods, eggs being a prime example, during an evaporation drying stage results in a change in molecular structure which actually adversely affects the taste of the resultant dried product and wherein considerable difficulty has been experienced in evolving a spray device which will promote efficient drying of the products, yet which will not adversely affect the taste of the dried conduct.

The present invention, then, has for an object the production of an apparatus capable of producing a spray having the characteristics of natural fog.

Another object of the invention is to produce a spray device capable of dispersing a liquid in a gaseous medium without adversely affecting the molecular structure of the dispersed liquid.

Still a further object of the invention is to produce a spray device of utmost mechanical and operating simplicity and reliability.

A further object of the invention is to produce a spray device of high efficiency.

An additional object of the invention is to produce a spray device having general application in a variety of areas of utility, and over a wide range of fluid viscosities.

These and other objects of the invention, not specifically referred to but inherent therein and readily apparent to those skilled in the art, may be accomplished by the combination of a plenum chamber having a smooth surface and at least one aperture therein disposed, means for continuously supplying a liquid to the plenum surface with sufficient kinetic energy to cause the liquid to form a film over the surface, the point of application of the liquid being a distance sufficient to permit formation of the film before the liquid passes thereover; and means to supply gas under pressure to the interior of the plenum whereby same is caused to emerge through said aperture at a pressure above the pressure of ambient gas acting on the surface of the liquid film, whereby the film is stressed to the point of rupture at the aperture and minuscule droplets are dispersed in the gaseous stream in the form of a spray having uniform, spherical particles closely approaching the characteristics of natural fog.

Preferably, the aperture is in the form of an elongated slot having sidewalls diverging outwardly toward the surface of the plenum.

Figure 3:
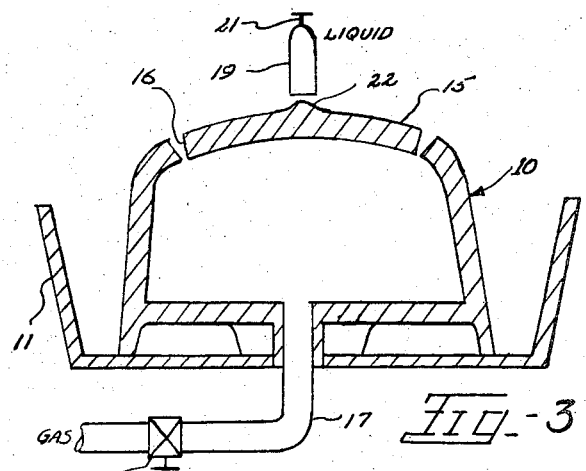
Figure 2:
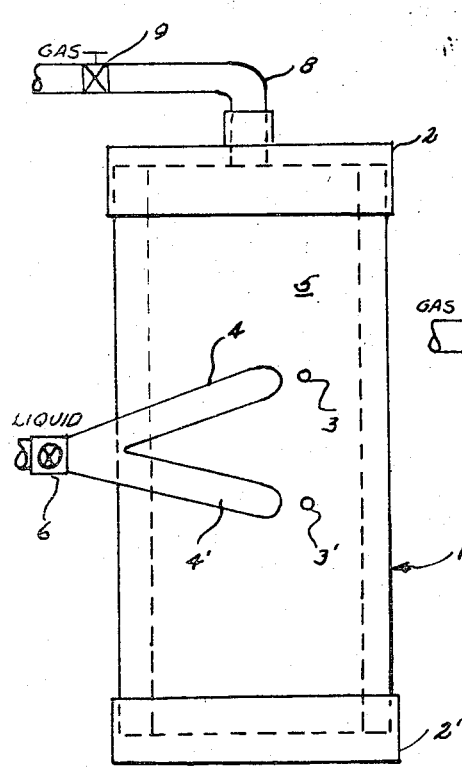
Figure 4:
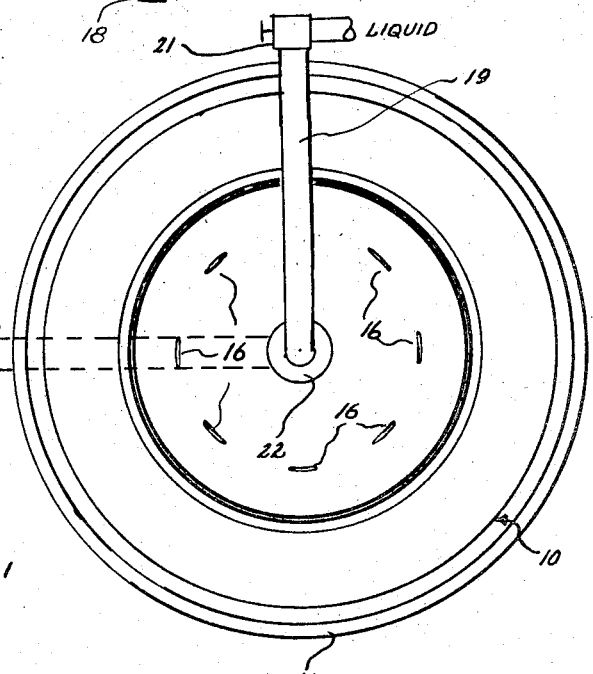

FIG. 1 is illustrative of a simple means of practicing the invention; shown in section, FIG. 2 is a plan view of the device shown in FIG. 1, FIG. 3 is a sectional view of a further form of the invention, FIG. 4 is a plan view of the device shown in FIG. 3, FIG. 5 is an elevational sectional view of a further form of the invention, FIGS. 6a, b and c are portions of cylindrical plenum chambers illustrating the various configurations of apertures in the plenum surface, and FIGS. 7a and 7b are sectional views taken along the lines 7a of FIG. 6a and 7b of FIG. 6c respectively.

Turning now to the drawings appended hereto and forming a part of this disclosure, and in particular FIGS. 1 and 2, a very simple form of the apparatus is disclosed. As shown in these figures the plenum consists of a cylindrical tube 1, having its ends closed by caps 2 and 2' so that the tube defines a closed chamber. The upper surface 5 of plenum 1 is provided with appertures 3, 3' which, it will be noted, are located below the high point of the cylinder. Expressed in another way the apertures 3, 3' are disposed on the downstream side of the cylindrical surface 5 as measured from a radial line passing through the center of the plenum and normal to the horizontal.

Disposed directly above the plenum 1 so as to discharge liquid on the surface at its approximate high point as designated by the letter A, is a pair of conduits 4, 4' having, if desired, a flow regulating valve 6 therein. Conduits 4, 4' terminate just above the plenum surface and, in turn are in communication with a liquid source (not shown) whereby liquid may be continuously discharged therethrough and deposited on the high point A of the plenum surface 5.

The interior of the plenum 1 is pressurized via a gaseous medium though conduit 8 also having, if desired, a regulator valve 9; said conduit being in communication with the interior of the plenum by any suitable connector and at any suitable point so as not to disrupt the continuity of the liquid receiving surface.

In a typical experimental arrangement utilized in evaluating the performance of the invention the plenum was simply a piece of copper tubing with a conventional soldered cap on one end and a threaded fitting on the other end. The liquid source comprised a household spigot and air was supplied to the plenum via a plastic hose fitted to a nipple connector in the threaded end fitting. Air pressure was supplied by a common, ordinary low pressure air compressor of the reciprocating type, capable of delivering air at pressures up to 25 p.s.i.g., With the apparatus described, air was admitted to the interior of the plenum at very low or modest pressure for example, from 3 to 20 p.s.i. gage, that is, above ambient air pressure surrounding the plenum. Liquid, in this case water, was caused to flow continuously from its source through the spigot and was discharged on the surface of the plenum at a rate sufficient to cause it to be carried down the sides of the plenum in the form of a continuous film.

While only one conduit and aperture were provided in the test equipment, in all respects it was the same as shown in FIGURES 1 and 2. At a pump pressure of less than 10 p.s.i.g., about 8 p.s.i.g., with the water flow about normal, i.e. such that the liquid did not splash but flowed smoothly over the plenum, it was found that a nearly mono-dispersed spray was produced, same having the visual appearance of a very dense natural fog. The rate of dispersion of liquid in this form, into the atmosphere was on the order of about five gallons per hour, for each standard c.f.m. delivered by the air compressor. It was also found that as long as the liquid was discharged on the plenum surface such that a smooth flow, hence thin film, was formed over the apertured surface 5, regardless of the quantity of liquid discharged, a dense spray having the characteristics of natural fog was produced with surprisingly little air flow and pressure requirements.

It was also discovered with more orderly arranged equipment such as that shown in FIGURES 1 and 2, that the capacity of the apparatus could be regulated so that, as the liquid film thickened over the aperture 3, an air pressure increase would increase the dispersion rate such that, with air pressure at about 10 p.s.i.g. absolute, the dispersion rate was about six gallons per hour per standard c.f.m. of air with no break down in the quality of the dispersed particles. For a given film thickness, a higher discharge pressure will in general result in a more finely dispersed fog.

It was also found that the rate of dispersion could be increased materially if the number of apertures in the plenum was increased. Accordingly, the device is illustrated in FIGURES 1 and 2 as embodying more than one plenum aperture 3, 3′, each being supplied with liquid from a conduit 4, 4′ respectively. Depending upon the spacing of the apertures and the shape of the plenum, a single feed might also be used to supply several apertures. It should also be understood, however, that in many cases a single aperture is sufficient to produce the desired dispersion rate with the spray retaining all of the characteristics of natural fog, i.e., comprised of very small and uniform spherical droplets.

As illustrated in FIGURE 2, not only does the number of apertures increase capacity, but also the shape and contour of the aperture 3 has an effect on spray uniformity and capacity. Thus, the apertures can be round or oval shaped. Also, the walls of the aperture can be parallel or diverge outwardly toward the exterior surface 5 of plenum 1. As shown then in FIGURE 6A, apertures 13, 13′ are simply round holes having a straight through circumferential wall. FIGURE 6B illustrates oval apertures 23, 23′ which also may have straight through walls. FIGURE 6C illustrates apertures 33, 33′ of the form of a narrow elongated slit having divergent walls opening outwardly toward the surface 5 of plenum 1. FIGS. 7*a* and *b* show the configuration of slot or aperture walls the aperture 13 of FIG. 7*a* being bounded by a straight through peripheral wall while the aperture 33 of FIG. 7*b* is defined by an outwardly opening peripheral wall.

A preferred arrangement insofar as spray uniformity, drop size and dispersing capacity are concerned is the formation of the aperture as an elongated slit.

For example, if a single slit .005″ wide by 0.5″ long discharges 0.85 standard cubic feet of air per minute (s.c.f.m.) it will disperse 100 gallons of water per day into a finely divided fog. This same amount of air, if used to supply ten smaller slits (at the same pressure as the single slit), will disperse 125 gallons of water per day. This dispersion rate is equivalent to a mass ratio of 0.08 pound of air per pound of water dispersed. According to published performance data, the spray from a conventional two fluid nozzle will break down at mass ratios below 0.1. It has been shown, then, that the subject apparatus is highly efficient, and even more so when the apertures (or in the preferred case slits) are small.

Turning now to FIGURES 3 and 4 another modification of the basic apparatus is disclosed. In this version plenum 10 is in the form of a dome-shaped hollow container seated in an open topped tray 11.

The top surface 15 of the plenum is provided with a series of apertures 16 disposed on a common diameter at equally spaced angular intervals. It will be seen that the apertures 16 are thus positioned at an area in the dome which is spaced from and below the point of maximum height of the surface 15.

Gas, under pressure, is admitted to the interior of the dome via a conduit 17 attached by any suitable connector through the bottom of the plenum and regulated by any suitable valve means 18.

The liquid to be dispersed is supplied to the top of the dome shaped plenum via conduit 19 and may be regulated, as to rate of flow quantity and velocity by any suitable valve means 21. A slight bubble 22 or even a spire may be provided in the top of the dome to assist in causing uniform flow of the liquid from the point of application radially downwardly and outwardly along the top surface of the plenum and then down the more or less vertical sides of plenum 10. By flowing in this manner the liquid film is stressed to extreme thinness at the common diameter wherein the apertures 16 are located. Air escaping from apertures 16 can then draw up the thin film and disperse it into minuscule particles having the characteristics of natural fog.

Since all of the liquid passing over plenum 10 is not dispersed by the gas emerging from aperture 16, the receptacle 11 acts as a receiver to collect the undispersed liquid. In most cases the receptacle will be emptied by a drain or by a recirculating means whereby the collected liquid is recirculated back through conduit 19.

In an experimental arrangement of the type shown in FIGURES 3 and 4, successful tests were also conducted with the dome and conduit 19 rotated 90° from the vertical so that the liquid was fed to the dome horizontally. Oriented in this manner it required an increase in the liquid feed velocity to cause the liquid film to run uphill and over the apertures disposed above the point of discharge from conduit 19. No other adjustments were required to obtain satisfactory operating conditions and a high quality spray.

Turning again to the drawings, there is shown a further form of the invention in FIGURE 5. As shown in this version, there is provided a liquid receiving trough 35 supplied by conduit 36 with a regulator valve 37 therein, as may be desirable. The bottom of trough 35 is provided with an opening 39. Having its upper end disposed within this opening is a boot-shaped plenum chamber 41 having a vertical leg 42 which curves smoothly into an enlarged, generally spherical shaped toe portion 43 having an aperture 44 therein.

A suitable conduit 45 provided with a regulator valve 46 if desired, supplies gas, under pressure, to the interior of the plenum 41 from a conventional pressure source such as a pump or the like (not shown).

As further illustrated in this figure, the aperture 39 is enlarged somewhat at its forward end to permit liquid from trough 35 to flow down the leg of the plenum 41 where it fans or spreads out in a film as it passes over the spherical toe 43.

It will also be seen that aperture 44 is so located in the toe of the plenum 41 that it is just at or near the high point of the top surface of this portion of the plenum.

While not shown in detail, it should be understood that the shape of aperture 44 may take any of the forms disclosed in FIGURES 6a, 6b or 6c and may be oriented in any way with respect to the flow direction of the liquid film, while the tray 47 serves the function of a receiver for excess liquid not dispersed during its flow over the plenum 41.

Having described an apparatus and several modifications thereof a brief description of the mode of operation thereof is as follows:

In every case, the liquid to be dispersed has kinetic energy imparted thereto as it is caused to reach the plenum surface. If this energy, be it from a pressure cause or by gravity, as in FIGURE 5, be sufficient to create a film of liquid before it reaches the gas emitting aperture, the liquid is stressed internally to some degree before it meets the gas flow. In addition to this stress the liquid film in the vicinity of the gas emitting aperture undergoes a further stress caused by the excess liquid flowing over spherical toe 43 and into tray 47. Although this fluid is excess in that it is not dispersed by the discharge gas, it is nonetheless a part of the total and continuous film passing over plenum 41. As such its kinetic energy is propagated upstream and effects the liquid film thickness in the vicinity of aperture 44. The effect of this kinetic energy is felt most markedly in the vicinity of aperture 44 because by design aperture 44 is located at the point where the largest change in film flow velocity occurs. Ideally, the velocity of the liquid supplied to the surface of plenum 41 is matched to the surface contour of plenum 41, so that the change in film velocity at the location of aperture 44 is just below that which is required to pull the film apart in tension. Thus, if the gas pressure is sufficient to stress the film to the rupture point, small particles of liquid are caused to break out of the film and are entrained in the gas and projected upwardly from the top of the liquid film. This fog like dispersion will continue indefinitely as long as the liquid film encounters the discharge gas.

By careful observation and measurement it has been determined that the spherical liquid particles can be varied somewhat in size by changing the pressure of the dispersing gas. It has also been found that for a given gas pressure the spray particles are more uniform in size than those obtained by conventional spray means. Of equal importance is the fact that the low pressure gas flow emitting from the plenum is so gentle in action that the spherical droplets appear to be formed directly from the thin liquid film. In conventional two fluid atomizers the liquid is first torn into ligaments before the liquid droplets are formed. Direct formation of droplets is important because it prevents alteration of the molecular structure of the spray particles, and it insures better spray distribution and uniformity.

While the various embodiments illustrated all incorporate a smooth surface having a slight curvature, it should be clearly understood that satisfactory results can be produced wherein the plenum surface lies in a single plane, so long as the kinetic energy of the liquid as applied to the surface, is sufficient to cause the liquid to "film out" before it passes over the point at which the apertures from within the plenum are located. This has been explained in our copending application Ser. No. 605,777, with reference being made therein to Vennard's "Elementary Fluid Mechanics" published April 1948 by John Wiley and Sons, Inc., New York, N.Y., in respect of surface tension and measurement thereof. Because it has been found easier to impart the proper kinetic energy to the liquid, and stress the film where the surface is curved the illustrative species are of the variety utilizing a smooth surface which is curved. Obviously however, the invention is not so limited as pointed out above.

Having thus described the novel apparatus, attention is invited to the claims defining the inventive concept, wherein:

What is claimed is:

1. An apparatus for dispersing liquid into a gaseous medium comprising a closed plenum chamber having a smooth, unconfining liquid receiving exterior surface, an aperture in said surface; means for supplying a gaseous medium to the interior of said plenum chamber at a pressure above ambient pressure acting on the outside of said chamber; means for causing liquid to be dispersed, impinge upon and flow over said, exterior plenum surface and the aperture therein; further means comprising the characteristics of the surface acting on the flowing liquids to disperse same in a thin, highly stressed film having an exposed unconfined surface on said plenum surface and over said aperture, said aperture emitting the gaseous medium outwardly from the interior of the plenum and transverse to the film whereby the film is additionally stressed and minuscule liquid particles, of liquid are dispersed therefrom in the form of a spray.

2. An apparatus as defined in claim 1 wherein the smooth surface is curved.

3. An apparatus as defined in claim 2 wherein the plenum is in the form of a cylinder.

4. An apparatus defined in claim 2 wherein the plenum is in the form of a closed chamber having a dome shaped liquid receiving surface defining the film forming area.

5. The apparatus defined in claim 4 wherein the dome shaped surface has a projection at its center and the liquid is discharged onto the surface at the top of the projection.

6. The apparatus as defined in claim 4 wherein said liquid receiving surface is provided with a plurality of equally spaced apertures lying on a common circumference spaced from the center of the plenum surface.

7. An apparatus as defined in claim 1 wherein the plenum is in the form of a hollow boot having a spherical toe portion, the aperture being disposed in the top surface of said toe portion.

8. The apparatus defined in claim 1 wherein the aperture is circumscribed by outwardly divergent walls.

9. The apparatus as defined in claim 1 including further a receptacle disposed beneath the plenum to receive liquid which is not dispersed from the surface thereof.

10. The apparatus defined in claim 1 wherein the aperture in the plenum surface is in the form of a slit.

11. The apparatus as defined in claim 1 wherein the liquid receiving surface is generally spherical.

12. The apparatus defined in claim 2 wherein the aperture is located at a point on the curved surface spaced downwardly of the point at which the liquid is discharged thereon.

13. An apparatus as defined in claim 1 wherein the plenum surface is wettable by the admitted liquid.

14. An apparatus for dispersing liquids into a gaseous medium in the form of a mono dispersed spray comprised essentially of uniformly sized, spherical droplets comprising in combination a smooth surface, having a small orifice at a first location therein; means for delivering a liquid flow to said surface at a second location thereon for flow in a direction toward said orifice at said first location; means for introducing a gas, under pressure above ambient pressure acting on said surface, through said aperture toward the liquid wetted side of said surface; said smooth surface being so contoured between said first and second locations and therebeyond to a third location so as to ensure that the direct path between said second and third locations on said surface is at least as high as adjacent portions of said surface lying directly to either side of said path so that fluid flowing between said second and third locations flows not only along said direct path but laterally outwardly to either side of said direct path to form a thin stressed film of liquid completely overlying said smooth surface and extending over said aperture.

15. An apparatus as defined in claim 14 wherein said surface is wettable by the liquid delivered at said second location.

16. An apparatus as defined in claim 14 wherein said surface is curved.

References Cited

UNITED STATES PATENTS

| | | | |
|---|---|---|---|
| 386,025 | 7/1888 | Palmer | 239—338 |
| 742,986 | 11/1903 | Hopkins | 239—338 X |
| 1,019,630 | 3/1912 | Gilman | 239—426 X |
| 1,346,811 | 7/1920 | Diebold | 239—3 |
| 1,574,238 | 2/1926 | Elder et al. | 239—426 |
| 1,859,935 | 5/1932 | Potts et al. | 239—418 X |
| 1,978,566 | 10/1934 | Cole | 239—426 X |
| 2,193,828 | 3/1940 | Mason | 158—91 X |
| 2,993,652 | 7/1961 | Curry | 239—338 |
| 3,097,645 | 7/1963 | Lester | 239—338 |

FOREIGN PATENTS

| | | |
|---|---|---|
| 780,176 | 3/1968 | Canada. |
| 383,370 | 1/1908 | France. |
| 453,458 | 4/1913 | France. |
| 492,703 | 4/1954 | Italy. |

M. HENSON WOOD, Jr., *Primary Examiner.*

HOWARD NATTER, *Assistant Examiner.*

U.S. Cl. X.R.

239—426, 434; 261—115, 78